United States Patent
Agarwal et al.

(10) Patent No.: US 12,504,929 B1
(45) Date of Patent: Dec. 23, 2025

(54) ARCHITECTURE TO TRANSMIT DATA ACROSS VIRTUALIZED ENVIRONMENTS VIA SHARED MEMORY

(71) Applicant: Cadence Design Systems, Inc., San Jose, CA (US)

(72) Inventors: Prashant Vardhan Agarwal, Noida (IN); Animesh Kumar Sinha, Patparganj (IN); Kanwarpreet Singh Grewal, Noida (IN); Madan Kumar Nath, Noida (IN); Wilson Seth, Gwalior (IN)

(73) Assignee: Cadence Design Systems, Inc., San Jose, CA (US)

( * ) Notice: Subject to any disclaimer, the term of this patent is extended or adjusted under 35 U.S.C. 154(b) by 53 days.

(21) Appl. No.: 18/167,027

(22) Filed: Feb. 9, 2023

(51) Int. Cl.
*G06F 3/06* (2006.01)
*G06F 13/16* (2006.01)

(52) U.S. Cl.
CPC .......... *G06F 3/0665* (2013.01); *G06F 3/0604* (2013.01); *G06F 3/0673* (2013.01); *G06F 13/1668* (2013.01)

(58) Field of Classification Search
CPC .... G06F 3/0665; G06F 3/0604; G06F 3/0673; G06F 13/1668
See application file for complete search history.

(56) References Cited

U.S. PATENT DOCUMENTS

| | | | |
|---|---|---|---|
| 10,261,723 B1 * | 4/2019 | Faibish | G06F 3/0607 |
| 2007/0011272 A1 * | 1/2007 | Bakke | G06F 9/5027 |
| | | | 709/217 |
| 2014/0025770 A1 * | 1/2014 | Warfield | H04L 45/74 |
| | | | 709/213 |
| 2015/0277769 A1 * | 10/2015 | Guo | G06F 3/0635 |
| | | | 711/114 |
| 2022/0345417 A1 * | 10/2022 | Kasichainula | H04L 47/30 |

FOREIGN PATENT DOCUMENTS

| | | | | |
|---|---|---|---|---|
| CN | 110806986 A | * | 2/2020 | G06F 12/0653 |
| KR | 20160144557 | * | 12/2016 | G06F 12/0868 |

OTHER PUBLICATIONS

Ren, Yi, et al. "Residency-aware virtual machine communication optimization: Design choices and techniques." 2013 IEEE Sixth International Conference on Cloud Computing. IEEE, 2013. (Year: 2013).*

(Continued)

*Primary Examiner* — Michael Alsip
(74) *Attorney, Agent, or Firm* — Foley & Lardner LLP (57) ABSTRACT

Aspects of this technical solution can a memory device including a shared region, the shared region addressable by a first operating system of a virtualized system and addressable by a second operating system, a transmission controller of the first operating system to store a transmission to the shared region of the memory device, a notification processor of the second operating system, the notification processor to detect the transmission stored to the shared region of the memory device, and a scheduler of the second operating system to obtain the transmission via the shared memory of the memory device, and to transmit the transmission to a communication bridge.

20 Claims, 6 Drawing Sheets

(56) References Cited

OTHER PUBLICATIONS

Li, Dingding, et al. "A High-Performance Inter-Domain Data Transferring System for Virtual Machines." J. Softw. 5.2 (2010): 206-213. (Year: 2010).*
Ren, Yi, et al. "Shared-memory optimizations for inter-virtual-machine communication." ACM Computing Surveys (CSUR) 48.4 (2016): 1-42. (Year: 2016).*
English Translation of KR 20160144557. (Year: 2016).*
English Translation of CN-110806986-A. (Year: 2020).*
Diakhaté, F., Perache, M., Namyst, R., Jourdren, H. (2009). Efficient Shared Memory Message Passing for Inter-VM Communications. In: César, E., et al. Euro-Par 2008 Workshops—Parallel Processing. Euro-Par 2008. Lecture Notes in Computer Science, vol. 5415. Springer, Berlin, Heidelberg. (Year: 2009).*
Zhang, Qi, and Ling Liu. "Workload adaptive shared memory management for high performance network i/o in virtualized cloud." IEEE Transactions on Computers 65.11 (2016): 3480-3494. (Year: 2016).*

\* cited by examiner

ARCHITECTURE TO TRANSMIT DATA ACROSS VIRTUALIZED ENVIRONMENTS VIA SHARED MEMORY

TECHNICAL FIELD

The present implementations relate generally to computing devices, including but not limited to architectures to transmit data across virtualized environments via shared memory.

BACKGROUND

Digital systems are increasingly expected to perform tasks at high speed and with high accuracy. However, increasing complexity of communication requirements can result in increasing delay or decreasing performance of communication by or between digital systems. Various pathways for communication can be vulnerable to performance degradation when implemented for communication with or between complex digital systems.

SUMMARY

Aspects of this technical solution are directed to a communication infrastructure providing a transmission path independent of throughput constraints of a communication bridge between particular operating system environments. This technical solution can include a virtualized environment including a virtual communication bridge between a user computing system and an external computing system. The user computing system can include at least one virtualized operating system executed by a host operating system. This technical solution can include a communication interface between the virtualized operating system and the host operating system, and a shared memory region addressable by both the virtualized operating system and the host operating system. The user computing system can selectively communicate between operating systems via the shared memory, to eliminate any bandwidth constraints of the communication interface between the virtualized operating system and the host operating system. The virtualized operating system and the host operating system can send and receive transmissions via the shared memory to achieve at least the technical improvement of increased communication bandwidth between virtualized systems. Thus, a technological solution for architectures to transmit data across virtualized environments via shared memory is provided.

At least one aspect is directed to a system to transmit data across virtualized environments via a shared memory. The system can include a memory device with a shared region, where the shared region can be addressable by a first operating system of a virtualized system and addressable by a second operating system. The system can include a transmission controller of the first operating system configured to store a transmission to the shared region of the memory device.

The system can include a notification processor of the second operating system, where the notification processor can be configured to detect the transmission stored to the shared region of the memory device. The system can include a scheduler of the second operating system configured to obtain the transmission via the shared memory of the memory device, and configured to transmit the transmission to a communication bridge.

At least one aspect is directed to a method to transmit data across virtualized environments via a shared memory. The method can include storing, by a first operating system of a virtualized system, a transmission to a shared region of a memory device, where the shared region can be addressable by the first operating system. The method can include detecting, by a second operating system hosting the first operating system, the transmission stored to the shared region of the memory device, where the shared region can be addressable by the second operating system. The method can include obtaining, by the second operating system, the transmission via the shared memory of the memory device. The method can include transmitting, by the second operating system, the transmission to a communication bridge.

At least one aspect is directed to a system to transmit data across virtualized environments via a shared memory. The system can include a memory device with a shared region, where the shared region can be addressable by a first operating system and addressable by a second operating system, and where the second operating system can be configured to execute the first operating system. The system can include a transmission controller of the first operating system configured to store a transmission to a first-in-first-out (FIFO) queue of the shared region of the memory device. The system can include a notification processor of the second operating system, where the notification processor can be configured to detect the transmission stored to the shared region of the memory device. The system can include a scheduler of the second operating system configured to obtain the transmission via the shared memory of the memory device, and configured to transmit the transmission to a communication bridge.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Aspects of this technical solution can include a user computing system configured to execute a host operating system (OS) and a virtualized operating system via the host operating system. For example, the virtualized operating system can correspond to a virtual machine that simulates one or more aspects of a hardware device and executes software based on the aspects of the hardware devices. The user computing system can include a shared memory architecture, a device communication interface, and a selection architecture to communicate selectively via the shared memory and the device communication interface. Based on a determination that a particular transmission is compatible with communication via the shared memory, the user computing system can select the shared memory architecture and can communicate the transmission between the virtualized operating system and the host operating system via the shared memory. The shared memory can support transfer of larger fragments of a transmission than the device communication interface or an entire transmission. The shared memory architecture can include a first-in-first-out (FIFO) queue to transmit write operations, and a flush processor to detect a read operation and to complete some or all pending write operations before executing a read operation. Thus, the technical solution including the shared memory architecture can provide at least the technical improvement of transmission speed increases of, for example, 75 times, over device communication interface transmission.

Figure 1:
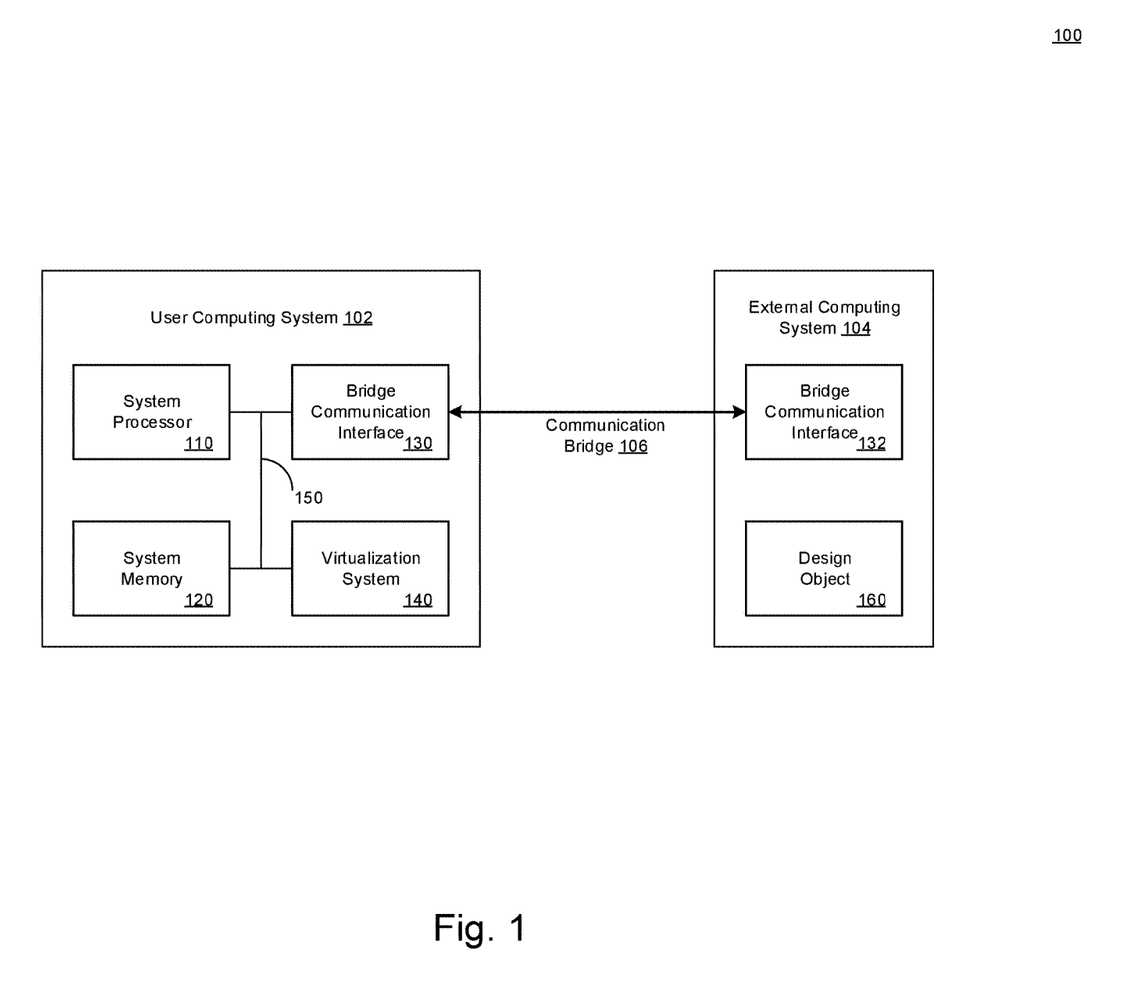
FIG. 1 depicts an example system, in accordance with present implementations.

FIG. 1 depicts an example system, in accordance with present implementations. As illustrated by way of example in FIG. 1, an example system 100 can include at least a user computing system 102, an external computing system 104, and a communication bridge 106. The user computing system 102 can include a physical computer system, a virtual computing system, an operating system, or any combination thereof. The user computing system 102 can include a system processor 110, a system memory 120, a bridge communication interface 130, a virtualization system 140, and a system communication interface 150. The external computing system 104 can include a physical computer system, a virtual computing system, an operating system, cloud server, local server, or any combination thereof. The external computing system 104 can include a bridge communication interface 132, and a design object 160.

The system processor 110 can execute one or more instructions associated with the user computing system 102. The system processor 110 can include an electronic processor, an integrated circuit, or the like including one or more of digital logic, analog logic, digital sensors, analog sensors, communication buses, volatile memory, nonvolatile memory, and the like. The system processor 110 can include, but is not limited to, at least one microcontroller unit (MCU), microprocessor unit (MPU), central processing unit (CPU), graphics processing unit (GPU), physics processing unit (PPU), embedded controller (EC), or the like. The system processor 110 can include a memory operable to store or storing one or more instructions for operating components of the system processor 110 and operating components operably coupled to the system processor 110. For example, the one or more instructions can include one or more of firmware, software, hardware, operating systems, embedded operating systems. The system processor 110 or the user computing system 102 generally can include one or more communication bus controller to effect communication between the system processor 110 and the other elements of the user computing system 102.

The system memory 120 can store data associated with the user computing system 102. The system memory 120 can include one or more hardware memory devices to store binary data, digital data, or the like. The system memory 120 can include one or more electrical components, electronic components, programmable electronic components, reprogrammable electronic components, integrated circuits, semiconductor devices, flip flops, arithmetic units, or the like. The system memory 120 can include at least one of a non-volatile memory device, a solid-state memory device, a flash memory device, and a NAND memory device. The system memory 120 can include one or more addressable memory regions disposed on one or more physical memory arrays. A physical memory array can include a NAND gate array disposed on, for example, at least one of a particular semiconductor device, integrated circuit device, and printed circuit board device.

The bridge communication interface 130 can communicatively couple the system processor 110 to the external computing system 104. The bridge communication interface 130 can communicate one or more instructions, signals, conditions, states, or the like between one or more of the system processor 110 and components, devices, blocks operatively coupled or that can be coupled therewith. The bridge communication interface 130 can include one or more digital, analog, or like communication channels, lines, traces, or the like. For example, the bridge communication interface 130 can include at least one serial or parallel communication line among multiple communication lines of a communication interface. The bridge communication interface 130 can include one or more wireless communication devices, systems, protocols, interfaces, or the like. The bridge communication interface 130 can include one or more logical or electronic devices including but not limited to integrated circuits, logic gates, flip flops, gate arrays, programmable gate arrays, and the like. The bridge communication interface 130 can include one or more telecommunication devices including but not limited to antennas, transceivers, packetizers, and wired interface ports. Any electrical, electronic, or like devices, or components associated with the bridge communication interface 130 can be associated with, integrated with, integrable with, replaced by, supplemented by, complemented by, or the like, the system processor 110 or any component thereof. Any electrical, electronic, or like devices, or components associated with the bridge communication interface 130 can be virtualized.

The virtualization system 140 can generate, execute, configure, or any combination thereof, one or more virtual devices corresponding to one or more computing devices or computing systems. For example, a computing device can include a logical device, a hardware component, a processor, a memory, a communication bus, or any combination thereof. The virtualization system 140 can execute one or more operating systems based on one or more corresponding virtual devices. For example, the virtualization system 140 can generate, by a host operating system, a virtual device, and can execute, by the host operating system the virtual device and a virtual operating system based on the virtual device. For example, a virtual device can include a virtual communication bridge that corresponds to a device configured to communicate via a particular communication protocol. The virtualization system 140 can effect communication between virtual devices or operating systems of the virtualization system 140 and external physical or virtual systems coupled with or that can be coupled with the virtualization system 140/

The system communication interface 150 can communicatively couple one or more components of the user computing system 102. The communication bridge 106 can communicate one or more instructions, signals, conditions, states, or the like between one or more of components of the user computing system 102. The communication bridge 106 can include one or more digital, analog, or like communication channels, lines, traces, or the like. For example, the communication bridge 106 can include at least one serial or parallel communication line among multiple communication lines of a communication interface.

The bridge communication interface 132 can correspond at least partially in one or more of structure and operation to the bridge communication interface 130. For example, the bridge communication interface 132 can include a physical or virtual device or system compatible with a protocol of the bridge communication interface 130. For example, the bridge communication interface 130 can include a physical device compatible with a physical device of the bridge communication interface 132. For example, the bridge communication interface 130 can include a virtual device compatible with a virtual device of the bridge communication interface 132. For example, the bridge communication interface 130 can include a physical device compatible with a virtual device of the bridge communication interface 132. For example, the bridge communication interface 130 can include a virtual device compatible with a physical device of the bridge communication interface 132.

The design object 160 can include a data structure corresponding to a structure of one or more physical devices or physical systems. For example, the design object 160 can correspond to a hardware emulation profile executable at the external computing system 104 to emulate a hardware device or system. The communication bridge 106 can include one or more virtual, digital, analog, or like communication channels, lines, traces, or the like. For example, the communication bridge 106 can include at least one communication channels corresponding to or compatible with a protocol of the bridge communication interfaces 130 and 132.

Figure 2:
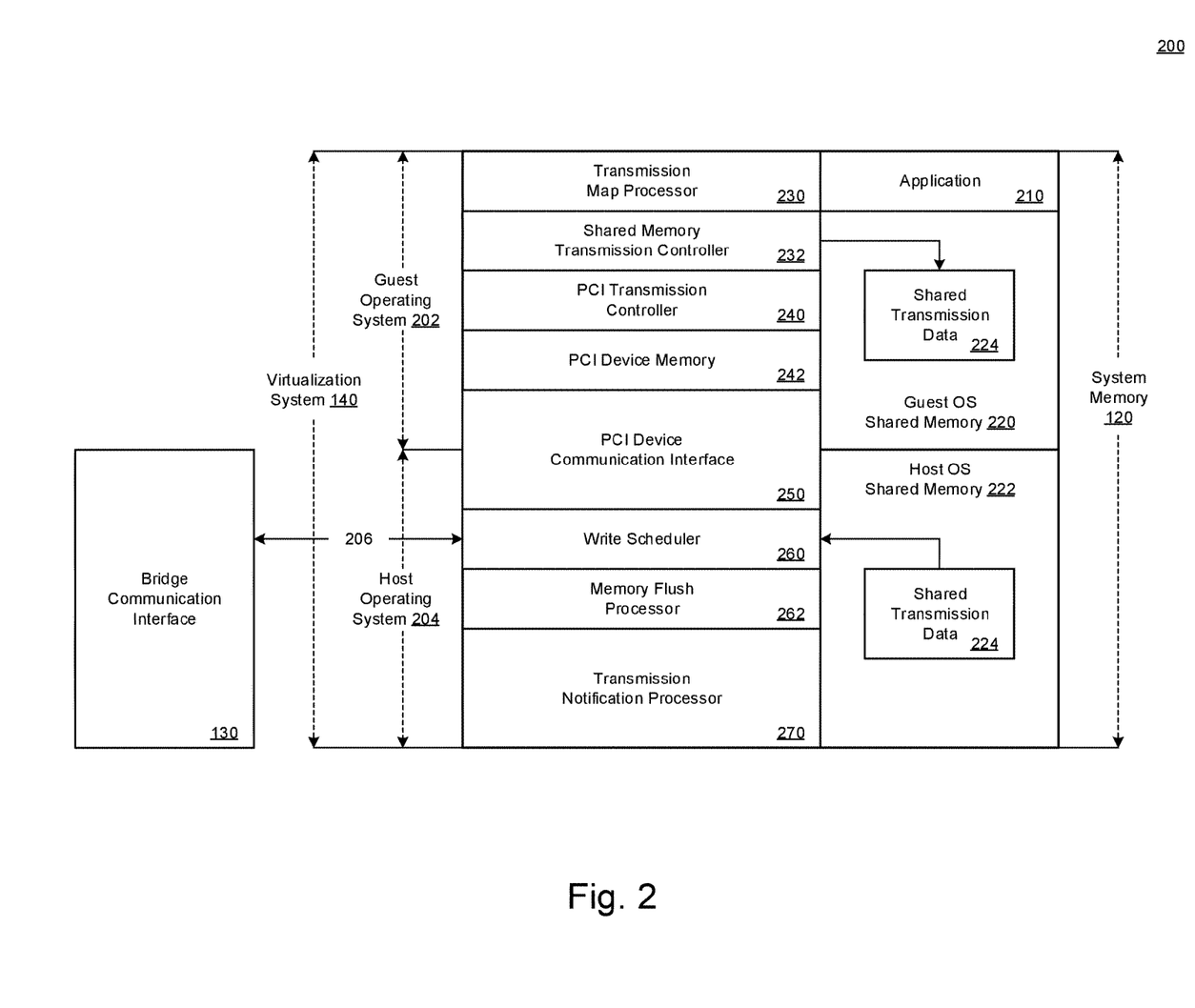
FIG. 2 depicts an example system architecture, in accordance with present implementations.

FIG. 2 depicts an example system architecture, in accordance with present implementations. As illustrated by way of example in FIG. 2, an example system architecture 200 can include at least a guest operating system 202, a host operating system 204, and a bridge communication 206. The bridge communication 206 can correspond to a send action from the host operating system 204 to the bridge communication interface 130, or a receive action from the bridge communication interface 130 to the host operating system 204.

The guest operating system 202 can include a virtualized operating system. The virtualized operating system can include hardware control instructions and program execution instructions. The guest operating system 202 can correspond to a high level operating system, a server operating system, an embedded operating system, or a boot loader. The guest operating system 202 can include one or more instructions operable specifically with or only with the system processor 110, the virtualization system 140, the host operating system 204, or any combination thereof. The guest operating system 202 can include at least an application 210, a guest OS shared memory 220 with shared transmission data 224, a transmission map processor 230, a shared memory transmission controller 232, a peripheral component interface (PCI) transmission controller 240, a PCI device memory 242, and a PCI device communication interface 250.

The application 210 can include one or more instructions and one or more data structures that can be transmitted between the guest operating system 202 and the host operating system 204. For example, the application 210 can obtain input via a user interface corresponding to instructions executable by the external computing system 104, or corresponding to the design object 160, or any portion thereof, or any combination thereof. For example, the application 210 can generate or obtain the design object 106, and can request a transmission from the guest operating system 202 and the host operating system 204 corresponding to the design object 160. The system memory 120 can store the application at a physical or logical location corresponding to an application region. The application region of the system memory 120 can be partially or fully distinct from a shared region corresponding to the guest OS shared memory 220. A distinct memory regions can correspond to a memory region have non-overlapping memory address ranges.

The guest OS shared memory 220 can include a portion of the system memory 120 addressable by the guest operating system 202. The guest OS shared memory 220 can include one or more physical or logical locations or addresses corresponding to a portion of the system memory 120. For example, the guest OS shared memory 220 can correspond to a contiguous or non-contiguous range of memory addresses, offsets, locations, partitions, or any combination thereof of the system memory 120. One or more of the guest operating system 202 and the virtualization system 140 can be configured to identify memory addresses that correspond to the guest OS shared memory 220. For example, the virtualization system can designate, reserve or restrict a portion of the system memory 120 to shared memory, and can allocate the shared memory of the system memory 120 to the guest operating system 202 as the guest OS shared memory 220.

The guest OS shared memory 220 can include a structure to control operation thereof. For example, the guest OS shared memory 220 can include a first-in-first-out (FIFO) queue to control an order of storing and retrieval of data stored thereon according to a FIFO order. One or more of the virtualization system 140 and the guest operating system 202 can apply, generate, enforce, or operate according to the structure of the guest OS shared memory 220. For example, the guest operating system 202 can include a physical or virtual memory controller or memory driver corresponding to the guest OS shared memory 220. The memory controller can be configured to add various transmissions to the FIFO queue and remove various transmissions at the FIFO queue in a FIFO order.

The shared transmission data 224 can include a data stored at the guest OS shared memory 220. The shared transmission data 224 can correspond to a transmission via the application 210, and can include the design object 160, a portion thereof, or communication corresponding to the design object 160, for example. The shared transmission data 224 can be located at an address or location of the guest OS shared memory 220 and can thus be shared with or communicated with, for example, the host operating system 204.

The transmission map processor 230 can determine whether to send a transmission from the guest operating system 202 to the host operating system 204 via the shared region of the system memory 120, or via a communication interface distinct from the shared memory. For example, the transmission map processor 230 can determine whether to send a transmission by determining whether the transmission or the source of the transmission satisfies a protocol condition. For example, the transmission map processor 230 can identify a source of the transmission as the application 210, and can determine whether the application 210 is compatible with or configured to generate a transmission compatible with one or more of the guest OS shared memory 220 and a FIFO queue of the guest OS shared memory 220. For example, the transmission map processor 230 determine whether the transmission generated by the application 210 is compatible with one or more of the guest OS shared memory 220 and a FIFO queue of the guest OS shared memory 220. The transmission map processor 230 can be coupled with multiple applications including the application 210, and can determine compatibility of a particular transmission or a particular source of transmission from among a plurality of transmissions or sources of transmission. For example, multiple sources of transmission can correspond to multiple applications. A protocol condition can correspond to a structure of the transmission compatible with storage at the guest OS shared memory 220 or a FIFO queue of the guest OS shared memory 220. For example, the protocol condition can include a particular minimum or maximum data size, a particular metadata configuration, presence of particular metadata objects, a particular block structure, or any combination thereof. For example, the system can include the map processor of the first operating system to determine that the transmission satisfies the protocol condition, the protocol condition indicating that the transmission is compatible with at least one of the transmission controller, the memory region, or the memory device.

The shared memory transmission controller 232 can store the transmission at the guest OS shared memory 220 as the shared transmission data 224. The shared memory transmission controller 232 can receive an indication that the transmission or the source of the transmission is compatible with the guest OS shared memory 220 or the FIFO queue of the guest OS shared memory 220. In response, the shared memory transmission controller 232 can store the transmission to the guest OS shared memory 220 or a last location or index of a FIFO queue of the guest OS shared memory 220. The shared memory transmission controller 232 can detect a type of the transaction, and can transmit an indication of the type of the transmission to the guest OS shared memory 220. For example, the shared memory transmission controller 232 can detect that the transmission corresponds to a read operation or a write operation, respectively, and can transmit an indication linked with the transmission that identifies the transmission as a read operation or a write operation, respectively. The shared memory transmission controller 232 can store the indication to a metadata storage of the guest OS shared memory 220. For example, the shared memory transmission controller 232 can store a vector corresponding to each position in the FIFO queue, and can set a bit position or a value of each index of the vector to correspond either to a read operation or a write operation identifier. For example, a read operation identifier can correspond to a '1' bit and a write operation identifier can correspond to a '0' bit.

For example, the system can include the transmission controller to store the transmission to a FIFO queue of the shared region. The system can include the scheduler to transmit the transmission to the communication bridge according to an order of the FIFO queue of the shared region. For example, the system can include the transmission controller to store the transmission, in response to a determination that the transmission satisfies a protocol condition. For example, the system can include the transmission controller to transmit the transmission via a communication interface, in response to a determination that the transmission does not satisfy the protocol condition The PCI transmission controller 240 can generate a PCI transmission based on the transmission from the application 210 and compatible with PCI device communication interface 250. The PCI transmission controller 240 can store the PCI transmission to the PCI device memory 242. For example, the PCI transmission controller 240 can identify a protocol corresponding to the PCI device communication interface 250, and can transform the transmission from the application 210 to be compatible with communication via the PCI device communication interface 250. For example, the PCI transmission controller 240 can detect a maximum bandwidth of the PCI device communication interface 250, and can divide the transmission from the application 210 into a plurality of divided transmissions that each satisfy the maximum bandwidth of the PCI device communication interface 250. The PCI transmission controller 240 can determine to divide the transmission from the application 210 based a structure of the transmission from the application 210. For example, the PCI transmission controller 240 can identify a buffer size corresponding to the transmission or a block size corresponding to a portion of the transmission. In response, the PCI transmission controller 240 can divide the transmission at one or more boundaries between one or more of the buffers or the blocks of the transmission. The PCI device memory 242 can include a physical or virtual memory corresponding to the PCI device communication interface 250. For example, the PCI device memory 242 can correspond to a buffer, register, or queue addressable by the PCI device communication interface 250 to obtain the PCI transmission.

The PCI device communication interface 250 can transmit the PCI transmission between the guest operating system and the host operating system. For example, the PCI device communication interface 250 can include a portion executed by the guest operating system 202 and a second portion executed by the host operating system 204. For example, the PCI device communication interface 250 can transmit the PCI transmission to the write scheduler by sending an indication of a PCI transmission to the host operating system 204 or a portion thereof. For example, the indication can correspond to an activation instruction to the write scheduler. For example, the indication can correspond to a polling flag stored by the PCI transmission controller 240 of the guest operating system 202 and readable by the host operating system 204 or a component thereof. The PCI device communication interface 250 can communicate the PCI transmission according to a PCI protocol. The PCI transmission controller 240, the PCI device memory 242, and the PCI device communication interface 250 are not limited to a PCI architecture or PCI protocol, and can communicate via and be structured according to one or more protocols distinct from the PCI protocol.

The host operating system 204 can include a virtualized operating system or an operating system to execute on physical devices. The host operating system 204 can include hardware control instructions and program execution instructions. The host operating system 204 can correspond to a high level operating system, a server operating system, an embedded operating system, or a boot loader. The host operating system 204 can include one or more instructions operable specifically with or only with the system processor 110, the virtualization system 140, or any combination thereof. For example, the host operating system 204 can execute the guest operating system 202 in accordance with one or more physical devices, or one or more virtual devices generated or configured by the virtualization system 140. The host operating system 204 can include at least a host OS shared memory 222 with the shared transmission data 224, a write scheduler 260, a memory flush processor 262, and a transmission notification processor 270.

The host OS shared memory 222 can correspond at least partially in one or more of structure and operation to the guest OS shared memory 220. For example, the host OS shared memory 222 can include a structure to control operation thereof that corresponds to a structure of the guest OS shared memory 220. For example, the host OS shared memory 222 can include a FIFO queue to control an order of storing and retrieval of data stored thereon according to a FIFO order, correspondingly to the FIFO queue of the guest OS shared memory 220. One or more of the virtualization system 140 and the host operating system 204 can apply, generate, enforce, or operate according to the structure of the host OS shared memory 222. For example, the host operating system 204 can include a physical or virtual memory controller or memory driver corresponding to the host OS shared memory 222. The host OS shared memory 222 can correspond to a range of address of the system memory 120 that corresponds to a range of addresses of the system memory allocated to the guest OS shared memory 220. Thus, the guest OS shared memory 220 and the host OS shared memory 222 can correspond to the same physical or logical portion of the system memory 120, and can together correspond to a common or shared memory space between the guest operating system 202 and the host operating system 204.

The write scheduler 260 can obtain one or more transmissions and can communicate the transmission via the bridge communication 206. The write scheduler 260 can detect an indication of presence of a transmission stored at the host OS shared memory 222, and can obtain the transmission from the host OS shared memory 222 in response to the detection. For example, the write scheduler 260 can detect an indication transmitted via the guest operating system 202 that corresponds to an activation instruction. For example, the write scheduler 260 can receive an activation instruction and can identify one or more transmissions stored at the host OS shared memory 222 based on a metric of the activation instruction. For example, the metadata storage of the host OS shared memory 222 can include a hash or identifier linking the activation instruction to one or more transmissions or types of transmission. The write scheduler 260 can identify one or more transmissions or types of transmissions, and can communicate those transmissions corresponding to the activation instruction as the bridge communication 206. A type of transmission can correspond, for example, to a read operation or a write operation.

For example, the system can include the write scheduler 260 to transmit, in response to a determination that the transmission corresponds to a read operation, a plurality of second transmissions stored at the FIFO queue of the shared region. For example, the system can include the write scheduler 260 to divide the transmission into a plurality of transmissions according to a bandwidth of the communication bridge 130. The communication bridge can transmit one or more of the transmissions via a communication bridge of a virtualized system to an external system. For example, the system can include the write scheduler 260 to transmit the transmission to a communication bridge 130 according to a first bandwidth corresponding to the communication bridge, in response to a determination that the transmission satisfies the protocol condition. The system can include the write scheduler 260 to transmit the transmission to a communication bridge 130 according to a second bandwidth corresponding to the communication interface, in response to a determination that the transmission does not satisfy the protocol condition, the first bandwidth greater than the second bandwidth.

The memory flush processor 262 can instruct one or more of the host OS shared memory 222 or the write scheduler 260 to communicate particular transmissions in a particular order. For example, the memory flush processor 262 can detect that the host OS shared memory 222 has received a transmission having a type corresponding to a read operation. In response, the memory flush processor 262 can instruct one or more of the host OS shared memory 222 or the write scheduler 260 to communicate one or more of the transmissions stored at the host OS shared memory 222 to the write scheduler to be communicated via the bridge communication 206. The memory flush processor 262 can be configured to instruct the write scheduler 260 to communicate all transmissions stored at the host OS shared memory 222 upon detection of receipt of a transmission having a read operation type, in accordance with a "flush on read" configuration. For example, the "flush on read configuration" can correspond to an action by the memory flush processor 262 to permit the host OS shared memory 222 to accumulate write transmissions until a read transmission is detected.

For example, the system can include a flush processor to determine that the transmission corresponds to a read operation. The scheduler can transmit, in response to a determination by the flush processor that the transmission corresponds to the read operation, a second transmission stored at the shared region. The scheduler can transmit, in response to a determination that the transmission corresponds to the read operation, a plurality of second transmissions stored at the FIFO queue of the shared region. For example, the write scheduler 260 can obtain and communicate write transmissions stored at the host OS shared memory 222 in an order corresponding to a FIFO queue of the host OS shared memory 222, until a read operation is detected. Upon detecting the read operation, the memory flush processor 262 can clear all write transmissions pending in the FIFO queue of the host OS shared memory 222 before adding the read transmission to the FIFO queue of the host OS shared memory 222. Thus, the memory flush processor 262 can achieve at least the technical improvement of preventing collisions between read and write operations communicated with a virtual bridge with an external system.

The transmission notification processor 270 can obtain an indication of presence of a transaction via one or more of the host OS shared memory 222 and the PCI device communication interface 250. For example, the transmission notification processor 270 can be configured to obtain, by the PCI device communication interface 250, indications for transmissions via the host OS shared memory 222 and the PCI device communication interface 250. For example, the transmission notification processor 270 can be configured to obtain, by the host OS shared memory 222, indications for transmissions via the host OS shared memory 222 and the PCI device communication interface 250. For example, the transmission notification processor 270 can be configured to obtain indications for transmissions via the host OS shared memory 222 by the host OS shared memory 222, and can be configured to obtain indications for transmissions via the PCI device communication interface 250 by the PCI device communication interface 250. Thus, the transmission notification processor 270 can achieve at least the technical improvement of including a transmission notification path that can be selectively activated via a PCI device communication interface and a shared memory architecture.

Figure 3:
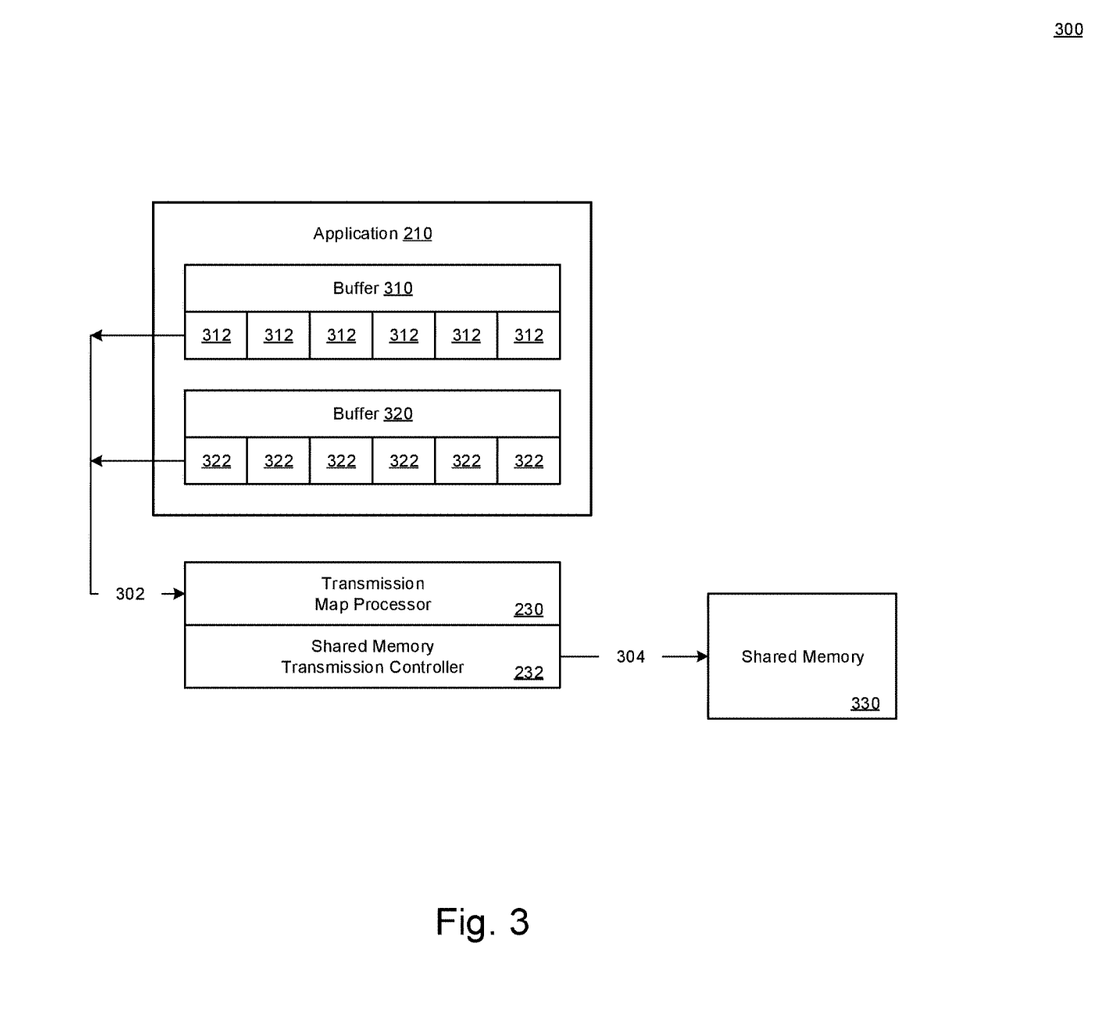
FIG. 3 depicts an example transmission from a guest operating system via a shared memory, in accordance with present implementations.

FIG. 3 depicts an example transmission from a guest operating system via a shared memory, in accordance with present implementations. As illustrated by way of example in FIG. 3, an example transmission from a guest operating system via a shared memory 300 can include at least an application block transmission 302, a shared memory block transmission 304, a buffer 310, a buffer 320, and a shared memory 330.

The application block transmission 302 can communicate one or more data elements from the application 210 to the transmission map processor 230. For example, data elements can correspond to or include one or more buffers or one or more blocks. The application 210 can transmit the data elements in a parallel or serial load operation. For example, the application 210 can generate or store the buffers 310 and 320 concurrently, and can transmit the buffers 310 and 320 in a parallel load operation to the transmission map processor 230. For example, the application 210 can generate or store the buffers 310 and 320 concurrently, can serialize the buffers 310 according to a key of the buffers 310 and 320, and can transmit the buffers 310 and 320 in a serial load operation to the transmission map processor 230 in an order indicated by the key.

The buffer 310 can correspond to a transmission of the application 210 to be communicated from the guest operating system 202 to the host operating system 204. The buffer 310 can include blocks 312. The buffer 310 can correspond, for example, to a size of a transmission having a bandwidth corresponding to the application 210. Thus, for example, a size of the buffer 310 can be determined, controlled, or allocated by the application 210. The blocks 312 can correspond to portions of the buffer 310 having discrete data. For example, the blocks 312 can each correspond to packets of the buffer 310. For example, a size of the buffer 310 can be determined or allocated as a number of blocks. The buffer 320 can correspond at least partially in one or more of structure and operation to the buffer 310, and can be distinct from the buffer 310. For example, the buffer 310 can be linked with a first process or thread of the application 210, and the buffer 320 can be linked with a second process or thread of the application 210. The buffer 320 can include blocks 322. The blocks 322 can correspond at least partially in one or more of structure and operation to the buffer 310, and can be distinct from the blocks 312.

The shared memory block transmission 304 can communicate the buffers to the shared memory 330 in response to a determination by the transmission map processor 230 to communicate the buffers 310 and 320 via the shared memory 330. The shared memory transmission controller 232 can send the shared memory block transmission 304 to the shared memory 330 in response to an instruction by the transmission map processor 230. The shared memory transmission controller 232 can send the buffers 310 and 320 in a serialized order to a FIFO queue of the shared memory 330. The shared memory 330 can correspond at least partially in one or more of structure and operation to the guest OS shared memory 220 and the host OS shared memory 222.

Figure 4:
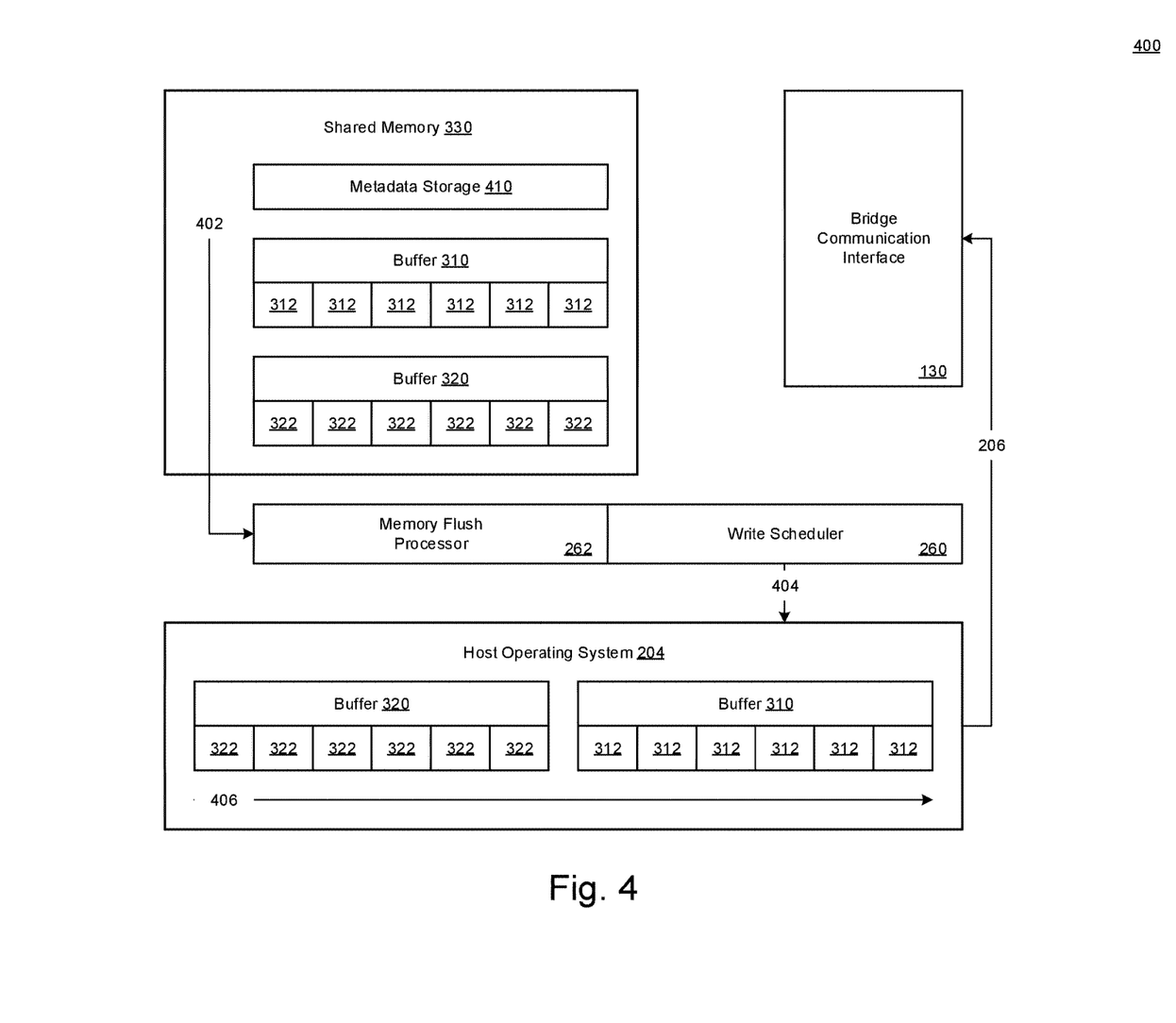
FIG. 4 depicts an example transmission to a host operating system via a shared memory, in accordance with present implementations.

FIG. 4 depicts an example transmission to a host operating system via a shared memory, in accordance with present implementations. As illustrated by way of example in FIG. 4, an example transmission to a host operating system via a shared memory 400 can include at least a shared memory block transmission 402, a host OS block transmission 404, an ordered transmission 406, and a metadata storage 410.

The shared memory block transmission 402 can communicate the buffers 310 and 320 from the shared memory 330 in response to a determination by the write scheduler 260 or the memory flush processor 262 to communicate the buffers 310 and 320 via the shared memory 330. The write scheduler 260 or the memory flush processor 262 can obtain the buffers 310 and 312, and their respective blocks 312 and 322 by the shared memory block transmission 402 in response to an activation instruction to the write processor or an indication of a read operation at the memory flush processor 262. The write scheduler 260 or the memory flush processor 262 can obtain the buffers 310 and 320 in a serialized order from a FIFO queue of the shared memory 330. The host OS block transmission 404 can communicate the buffers 310 and 320 to the host operating system 204 via the write scheduler 260. The write scheduler 260 can send the buffers 310 and 320 in a FIFO order according to a FIFO queue of the shared memory 330. The ordered transmission 406 can correspond to the FIFO order of the FIFO queue of the shared memory 330.

The metadata storage 410 can include one or more metrics corresponding to one or more of the shared memory 330, the buffers 310 and 320, and the blocks 312 and 322. For example, the metadata storage 410 can store metrics corresponding to a structure or operation of a FIFO queue of the shared memory 330. For example, the metadata storage 410 can store metrics corresponding to bandwidth or buffer size of the application 210 or a plurality of applications including the application 210. For example, the metadata storage 410 can store metrics that indicate whether various individual buffers including the buffers 310 and 320 correspond to read operations or write operations.

Figure 5:
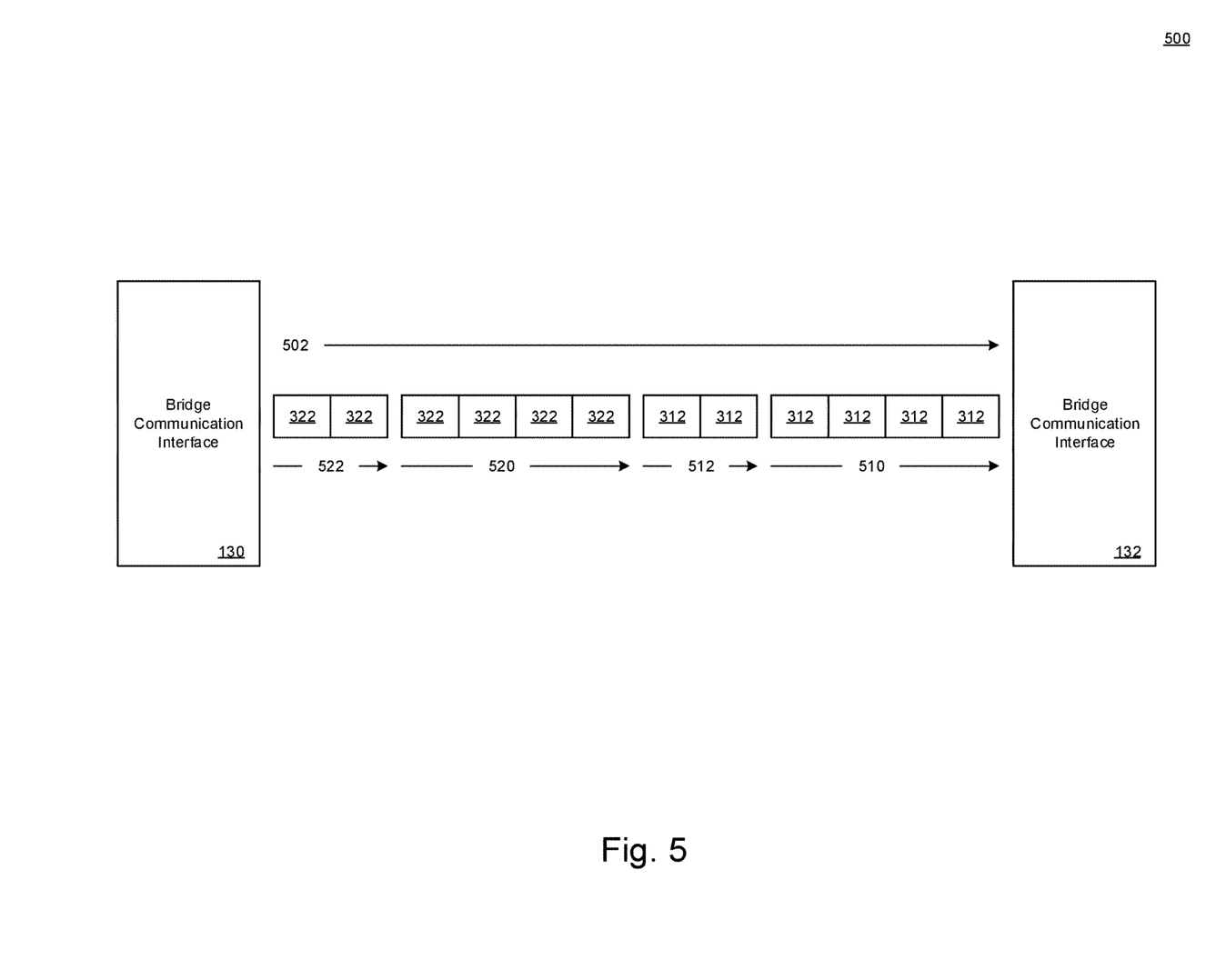
FIG. 5 depicts an example transmission via a communication bridge, in accordance with present implementations.

FIG. 5 depicts an example transmission via a communication bridge, in accordance with present implementations. As illustrated by way of example in FIG. 5, an example transmission via a communication bridge 500 can include at least a bridge communication 502.

The virtual bridge communication 502 can communicate the blocks 312 and 322 of the buffers 310 and 320 between the bridge communication interfaces 130 and 132. For example, the bridge communication interface 130 can structure, order, or divide the blocks 312 and 322 according to a protocol corresponding to the virtual bridge communication 502. The virtual bridge communication 502 can correspond at least partially in one or more of structure and operation to the communication bridge 106. The virtual bridge communication 502 can include a first bridge communication 510, a second bridge communication 512, a third bridge communication 520, and a fourth bridge communication 522.

The first bridge communication 510 can include a first portion of the blocks 312. For example, the first portion of the blocks 312 can correspond to a maximum size or expected size of a communication via the protocol of the virtual bridge communication 502. The second bridge communication 512 can include a second portion of the blocks 312. For example, the second portion of the blocks 312 can correspond to a size less than a maximum size or expected size of a communication via the protocol of the virtual bridge communication 502. For example, the second bridge communication 512 can include a portion of the blocks 312 of the buffer 310 that exceed a size of a communication via the protocol of the virtual bridge communication 502, and are thus excluded from the first bridge communication 510. Thus, this technical solution can include at least the technical improvement of communication via a virtual bridge that is not constrained by bandwidth of a communication bridge between guest and host operating systems.

The third bridge communication 520 can include a first portion of the blocks 322. For example, the first portion of the blocks 322 can correspond to a maximum size or expected size of a communication via the protocol of the virtual bridge communication 502. The fourth bridge communication 522 can include a second portion of the blocks 322. For example, the second portion of the blocks 322 can correspond to a size less than a maximum size or expected size of a communication via the protocol of the virtual bridge communication 502. For example, the fourth bridge communication 522 can include a portion of the blocks 322 of the buffer 320 that exceed a size of a communication via the protocol of the virtual bridge communication 502, and are thus excluded from the third bridge communication 520. The bridge communications 510, 512, 520 and 530 are not limited to the division illustrated herein by way of example, and can be conducted to include or exclude division of buffers based on a protocol bandwidth. For example, the bridge communication interfaces 130 and 132

Figure 6:
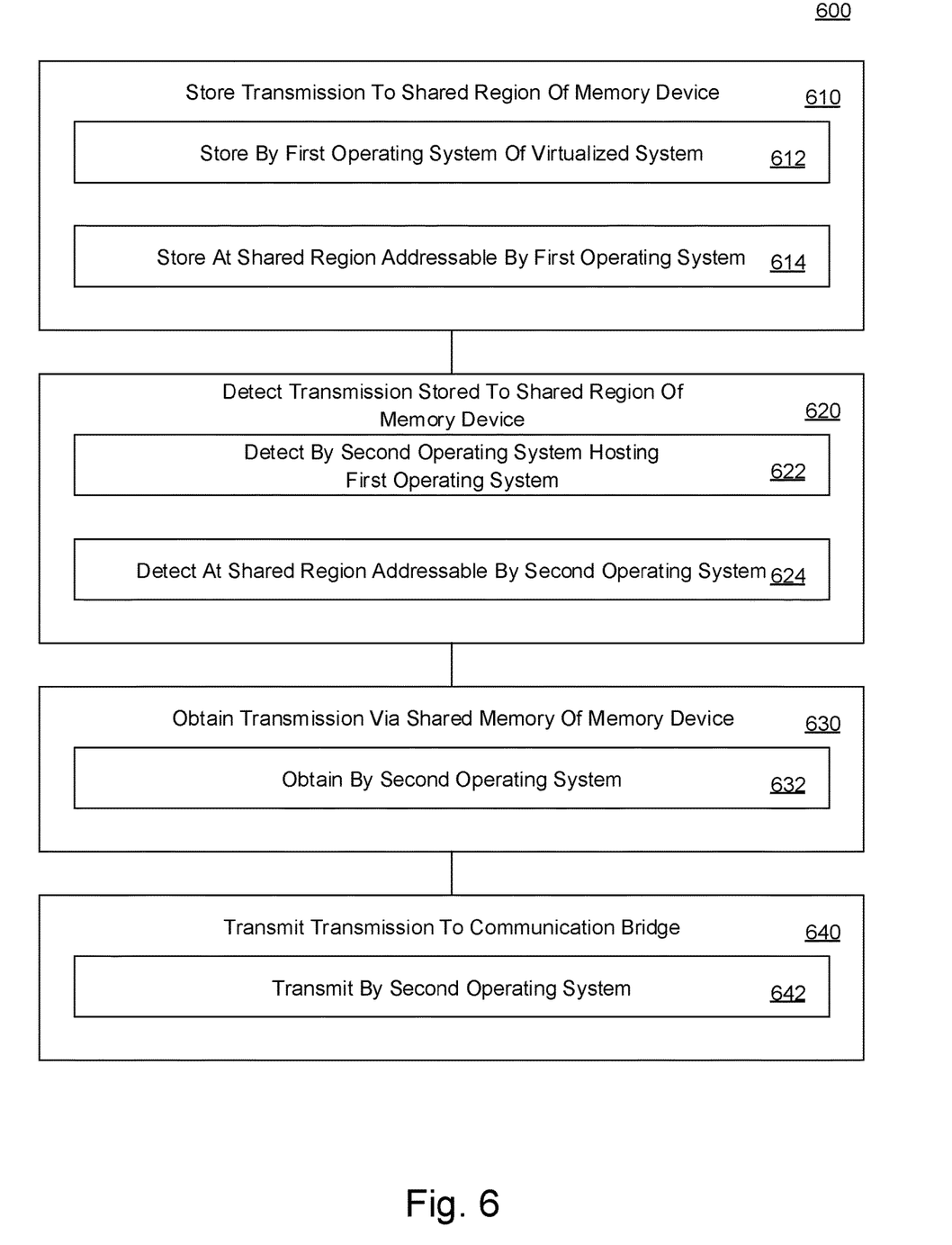
FIG. 6 depicts an example method of transmitting data across virtualized environments via shared memory, in accordance with present implementations.

FIG. 6 depicts an example method to transmit data across virtualized environments via shared memory, in accordance with present implementations. At least one of the system 100 and 200 can perform method 600.

At 610, the method 600 can store a transmission to a shared region of a memory device. For example, the method can include storing, by the first operating system, the transmission to a first-in-first-out (FIFO) queue of the shared region. The method can include transmitting, by the second operating system, the transmission to the communication bridge according to an order of the FIFO queue of the shared region. At 612, the method 600 can store by a first operating system of a virtualized system. At 614, the method 600 can store at shared region addressable by the first operating system. For example, the method can include storing, by the first operating system in response to a determination that the transmission satisfies a protocol condition, the transmission to the shared region of the memory device.

At 620, the method 600 can detect the transmission stored to the shared region of the memory device. For example, the method can include determining, by the first operating system, that the transmission satisfies the protocol condition, the protocol condition indicating that the transmission is compatible with at least one of the transmission controller, the memory region, or the memory device. At 622, the method 600 can detect by a second operating system hosting the first operating system. At 624, the method 600 can detect at shared region addressable by the second operating system.

At 630, the method 600 can obtain the transmission via the shared memory of the memory device. For example, the method can include dividing, by the second operating system, the transmission into a plurality of transmissions according to a bandwidth of the communication bridge. The method can include transmitting, by the second operating system to an external system, one or more of the transmissions via a communication bridge of a virtualized system. At 632, the method 600 can obtain by the second operating system.

At 640, the method 600 can transmit the transmission to a communication bridge. For example, the method can include transmitting, by the first operating system, in response to a determination that the transmission does not satisfy the protocol condition, the transmission via a communication interface. For example, the method can include transmitting, by the second operating system, the transmission to a communication bridge according to a first bandwidth corresponding to the communication bridge, in response to a determination that the transmission satisfies the protocol condition. The method can include transmitting, by the second operating system, the transmission to the communication bridge according to a second bandwidth corresponding to the communication interface, in response to a determination that the transmission does not satisfy the protocol condition, the first bandwidth greater than the second bandwidth. At 642, the method 600 can transmit by the second operating system. For example, the method can include transmitting, by the second operating system in response to determining that the transmission corresponds to a read operation, a second transmission stored at the shared region. For example, the method can include transmitting, by the second operating system in response to determining that the transmission corresponds to a read operation, a plurality of second transmissions stored at the FIFO queue of the shared region.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A system to transmit data across virtualized environments via shared memory, the system comprising:
   a memory device including a shared region, the shared region addressable by a first operating system of a virtualized system and addressable by a second operating system;
   a transmission controller of the first operating system configured to store a transmission to a plurality of blocks of a corresponding plurality of buffers for the shared region of the memory device, the shared memory containing one or more write operations, the transmission including a read operation;
   a notification processor of the second operating system, the notification processor configured to detect the transmission stored to the shared region of the memory device; and
   a scheduler of the second operating system configured to obtain each block of the transmission via the plurality of buffers in the shared memory of the memory device and configured to transmit the transmission to a communication bridge, wherein the scheduler transmits each write operation of the one or more write operations stored in the shared memory in response to detecting the read operation in the transmission.

2. The system of claim 1, further comprising:
   the transmission controller further configured to store the transmission to a first-in-first-out (FIFO) queue of the shared region; and
   the scheduler further configured to transmit the transmission to the communication bridge according to an order of the FIFO queue of the shared region.

3. The system of claim 2, further comprising:
   the scheduler further configured to transmit, in response to a determination that the transmission corresponds to the read operation, a plurality of second transmissions stored at the FIFO queue of the shared region.

4. The system of claim 1, further comprising:
   a flush processor configured to determine that the transmission corresponds to the read operation; and
   the scheduler further configured to transmit, in response to a determination by the flush processor that the transmission corresponds to the read operation, a second transmission stored at the shared region.

5. The system of claim 1, further comprising:
   the scheduler further configured to divide the transmission into a plurality of transmissions according to a bandwidth of the communication bridge; and
   the communication bridge configured to transmit one or more of the transmissions via the communication bridge of the virtualized system to an external system.

6. The system of claim 1, further comprising:
the transmission controller further configured to store the transmission, in response to a determination that the transmission satisfies a protocol condition.

7. The system of claim 1, further comprising:
the transmission controller further configured to transmit the transmission via a communication interface, in response to a determination that the transmission does not satisfy a protocol condition.

8. The system of claim 7, further comprising:
the scheduler further configured to transmit the transmission to the communication bridge according to a first bandwidth corresponding to the communication bridge, in response to a determination that the transmission satisfies the protocol condition; and
the scheduler further configured to transmit the transmission to the communication bridge according to a second bandwidth corresponding to the communication interface, in response to a determination that the transmission does not satisfy the protocol condition, the first bandwidth greater than the second bandwidth.

9. The system of claim 6, further comprising:
a map processor of the first operating system configured to determine that the transmission satisfies the protocol condition, the protocol condition indicating that the transmission is compatible with at least one of the transmission controller, the memory region, or the memory device.

10. A method to transmit data across virtualized environments via shared memory, the method comprising:
storing, by a first operating system of a virtualized system, a transmission to a plurality of blocks of a corresponding plurality of buffers for a shared region of a memory device, the shared region addressable by the first operating system, the shared memory containing one or more write operations, the transmission including a read operation;
detecting, by a second operating system hosting the first operating system, the transmission stored to the shared region of the memory device, the shared region addressable by the second operating system;
obtaining, by the second operating system, each block of the transmission via the plurality of buffers in the shared memory of the memory device; and
transmitting, by the second operating system, the transmission to a communication bridge, wherein the second operating system transmits each write operation of the one or more write operations stored in the shared memory in response to detecting the read operation in the transmission.

11. The method of claim 10, further comprising:
storing, by the first operating system, the transmission to a first-in-first-out (FIFO) queue of the shared region; and
transmitting, by the second operating system, the transmission to the communication bridge according to an order of the FIFO queue of the shared region.

12. The method of claim 11, further comprising:
transmitting, by the second operating system in response to determining that the transmission corresponds to the read operation, a plurality of second transmissions stored at the FIFO queue of the shared region.

13. The method of claim 10, further comprising:
transmitting, by the second operating system in response to determining that the transmission corresponds to the read operation, a second transmission stored at the shared region.

14. The method of claim 10, further comprising:
dividing, by the second operating system, the transmission into a plurality of transmissions according to a bandwidth of the communication bridge; and
transmitting, by the second operating system to an external system, one or more of the transmissions via the communication bridge of the virtualized system.

15. The method of claim 10, further comprising:
storing, by the first operating system in response to a determination that the transmission satisfies a protocol condition, the transmission to the shared region of the memory device.

16. The method of claim 10, further comprising:
transmitting, by the first operating system, in response to a determination that the transmission does not satisfy a protocol condition, the transmission via a communication interface.

17. The method of claim 16, further comprising:
transmitting, by the second operating system, the transmission to the communication bridge according to a first bandwidth corresponding to the communication bridge, in response to a determination that the transmission satisfies the protocol condition; and
transmitting, by the second operating system, the transmission to the communication bridge according to a second bandwidth corresponding to the communication interface, in response to a determination that the transmission does not satisfy the protocol condition, the first bandwidth greater than the second bandwidth.

18. The method of claim 15, further comprising:
determining, by the first operating system, that the transmission satisfies the protocol condition, the protocol condition indicating that the transmission is compatible with at least one of a transmission controller, the memory region, or the memory device.

19. A system to transmit data across virtualized environments via shared memory, the system comprising:
a memory device including a shared region, the shared region addressable by a first operating system and addressable by a second operating system, the second operating system configured to execute the first operating system;
a transmission controller of the first operating system configured to store a transmission to a plurality of blocks of a corresponding plurality of buffers for a first-in-first-out (FIFO) queue of the shared region of the memory device, the shared memory containing one or more write operations, the transmission including a read operation;
a notification processor of the second operating system, the notification processor configured to detect the transmission stored to the shared region of the memory device; and
a scheduler of the second operating system configured to obtain each block of the transmission via the plurality of buffers in the shared memory of the memory device and configured to transmit the transmission to a communication bridge, wherein the scheduler transmits each write operation of the one or more write operations stored in the shared memory in response to detecting the read operation in the transmission.

20. The system of claim 19, further comprising:
a flush processor configured to determine that the transmission corresponds to the read operation; and
the scheduler further configured to transmit, in response to a determination that the transmission corresponds to the read operation, a plurality of second transmissions stored at the FIFO queue of the shared region.

\* \* \* \* \*